(12) United States Patent
Winsor et al.

(10) Patent No.: US 8,432,536 B1
(45) Date of Patent: Apr. 30, 2013

(54) MULTI-FUNCTIONAL OPTICAL LINKS

(75) Inventors: Robert Scott Winsor, Round Hill, VA (US); Valentine Christian, Churchville, NY (US); Paul Zavattero, Webster, NY (US)

(73) Assignee: Exelis, Inc., Mclean, VA (US)

( * ) Notice: Subject to any disclaimer, the term of this patent is extended or adjusted under 35 U.S.C. 154(b) by 590 days.

(21) Appl. No.: 12/695,205

(22) Filed: Jan. 28, 2010

(51) Int. Cl.
*G01P 3/36* (2006.01)

(52) U.S. Cl.
USPC .......................................... 356/28; 356/28.5

(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS 5,781,283 A * 7/1998 Dammann et al. ........... 356/28.5

* cited by examiner

*Primary Examiner* — Luke Ratcliffe
(74) *Attorney, Agent, or Firm* — RatnerPrestia (57) ABSTRACT

The present invention relates to a system for determining distance between a first platform and a second platform. In one embodiment, the first platform includes a plurality of receivers which are positioned at different distances from the second platform. Each receiver receives a signal from the second platform. Each receiver includes multiple time slots for placing the received signal in a time slot that corresponds to an arrival interval of the received signal. The system also includes a processor for determining the distance between the first and second platforms based on examining the arrival interval of the received signal in each of the receivers.

17 Claims, 12 Drawing Sheets

MULTI-FUNCTIONAL OPTICAL LINKS

FIELD OF INVENTION

The present invention relates, in general, to systems having multi-functional optical (MFO) links. More particularly, an MFO system includes mobile communication platforms which perform various functions with each other over the MFO links. The platforms are temporally and spatially coordinated among each other thereby increasing utility.

BACKGROUND OF THE INVENTION

In conventional systems, communication platforms are limited in performance because the accuracy of clock coordination and spatial coordination are limited. Poor clock coordination between platforms results in inadequate detection of time sensitive signals. Such poor clock coordination may be attributed to inaccurate knowledge of the distance between the platforms. Thus, functions which are time and space dependent suffer, when time and spatial coordination between moving platforms are inaccurate.

SUMMARY OF THE INVENTION

To meet this and other needs, and in view of its purposes the present invention provides a system for determining distance between a first platform and a second platform. The first platform includes a plurality of receivers, each being positioned at a different distance from the second platform, and for receiving a signal from the second platform. Each receiver includes multiple time slots for placing the received signal in a time slot which corresponds to an arrival interval of the received signal. Also included is a processor for determining the distance between the first and second platforms based on examining the arrival interval of the received signal in each of the receivers.

In one embodiment, the receivers are positioned at staggered distances from the second platform thereby receiving the received signal at temporal offsets. Staggering the receivers allows the received time slots of the receivers to overlap each other in time. In general, the receivers are positioned at N distances from the second platform to produce N smaller time slots in each of the larger time slots. Furthermore, the processor selects one of the N smaller time slots which corresponds to a smaller arrival interval of the received signal. The selection is performed by comparing the time slot of the received signal in each of the receivers.

In another embodiment, the system for determining distance between a first platform and a second platform utilizes a pulse train. In particular, the first platform includes a receiver for receiving a pulse train from the second platform and placing the pulse train into a sequence of time slots. A processor then examines the pulse train against the sequence of time slots, and determines the distance between the first and second platforms based on absence of a pulse in at least one absent time slot. In general, the pulse train has a period that is greater than a width of at least one time slot, and the processor determines the distance between the first and second platforms based on a position of the at least one absent time slot in the sequence.

In one embodiment, the processor determines the distance between the first and second platforms by counting a number of time slots from a first pulse in the pulse train to the at least one absent time slot. The processor determines a smaller time slot in a first time slot where a first pulse of the pulse train is received, based on a position of the at least one absent time slot in the sequence. In general, the processer determines that the distance between the first and second platforms increases in response to a decrease in the number of time slots counted from the first pulse in the pulse train to the at least one absent time slot.

In another embodiment, the system determines the velocity between first and second platforms by counting fringes. In particular, the first platform comprises a receiver for receiving a signal from the second platform. The receiver includes multiple phase modulators (PMs), in which the PMs have phase angles different from each other, and each PM forms a signal having a time varying frequency. Also included are multiple mixers producing multiple fringe signals based on the time varying signals of the PMs and the received signal from the second platform, and a processor for counting the fringes in at least one of the fringe signals. In general, the fringes of the at least one fringe signal are counted when the frequency of the at least one fringe signal is below a predetermined frequency threshold. The processor determines the velocity between the first and second platform based on a number of fringes counted in a time period.

In one embodiment, local oscillators are input to the mixers, and the PMs modulate the signal received from the second platform producing the time varying signals. The time varying signals are then mixed with the local oscillators producing the fringe signals.

In another embodiment, local oscillators are input to the mixers, and the PMs modulate the local oscillators producing the time varying signals. The time varying signals are mixed with the signal received from the second platform producing the fringe signals.

In another embodiment, quadrature local oscillators are input to quadrature mixers. The local oscillators are 90 degrees out of phase with the quadrature local oscillators. The mixers produce inphase time varying fringe signals and the quadrature mixers produce quadrature time varying fringe signals. In general, the processor determines a direction of the velocity based on the inphase and quadrature fringe signals.

The processor determines an initial distance between the first and second platforms, and tracks the distance over a time period based on the initial distance, determined velocity and direction of the velocity.

In another embodiment, the receiver receives a plurality of signals having different wavelengths. The mixers produce a plurality of fringe signals for each of the different wavelength signals, and the processor refines the distance between the first and second platforms by determining a time when the fringe signals match. The time in which the fringe signals match corresponds to a predetermined distance based on the wavelengths of the different wavelength signals.

In general, the receiver receives at least three signals having different respective wavelengths, and the mixers produce three fringe signals. The processor determines, in a time period, a percentage of fringe match between: a) a first fringe signal and a second fringe signal, b) the first fringe signal and a third fringe signal, and c) the second fringe signal and the third fringe signal. In general, the processor compares the percentage of fringe match of a-c at a time to refine the distance between the first and second platforms.

It is understood that the foregoing general description and the following detailed description are exemplary, but are not restrictive, of the invention.

DETAILED DESCRIPTION OF THE INVENTION

As will be described, the present invention provides a system having a multi-functional optical (MFO) link for establishing and maintaining accurate time and spatial relationships between mobile communication platforms. Using the present invention, a platform may determine its distance to another platform with a micron level of precision. Such precision allows for accurate clock synchronization and geo-location tracking between moving, or stationary platforms. Time and space dependent applications result in increased performance when using the present invention.

Figure 1A:
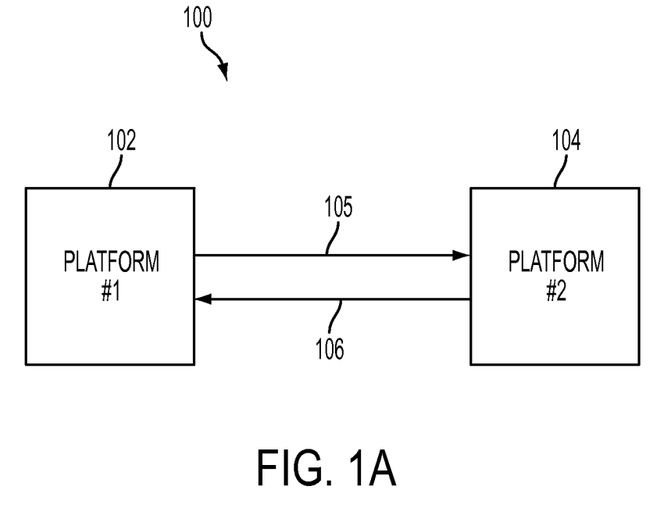
FIG. 1a is a block diagram of an MFO system including two communication platforms, according to an embodiment of the present invention.

In one embodiment, FIG. 1a shows two platforms (102 and 104) moving relative to one another. Both platforms 102 and 104 transmit and receive optical signals (e.g. an optical laser signal). For example, optical signal 105 may be transmitted from platform 102 and reflected from platform 104 as optical signal 106 to determine velocity and/or distance between the platforms. The optical signals of the present invention may be transmitted/received by any optical system, such as a telescope and stationary/steerable optical mirrors positioned between a light transmitter and a light receiver.

Figure 1B:
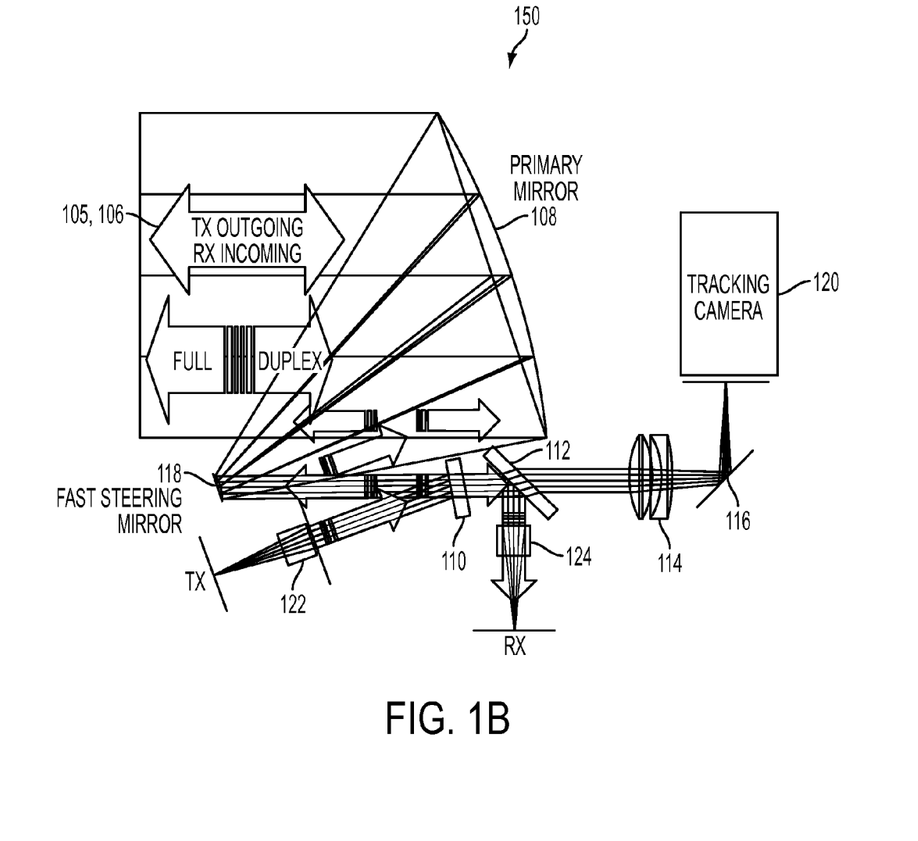
FIG. 1b shows the receive and transmit optical paths formed by an optical system, including a telescope, a steering mirror and other optical elements, residing on a communication platform, according to an embodiment of the present invention.

FIG. 1b shows the paths of transmit/receive optical signals 105 and 106, traversing a primary mirror of a telescope in optical system 150 of platform 102. The optical system, which may be included on platforms 102 and 104, includes primary mirror 108 communicating with stationary mirror 116 and fast steering mirror 118. The optical system also includes optical splitters 110 and 112, lenses 114, light transmitter 122, light receiver 124 and tracking camera 120.

During transmission, a platform (e.g. platform 102) transmits a light beam (e.g. beam 105) towards another platform (e.g. platform 104). Specifically, transmitter 122 of optical system 150 outputs light beam 105 which is split by splitter 110 and reflected by both fast steering mirror 118 and primary mirror 108.

During reception, light beam 106, which may have been reflected by platform 104 is received by optical system 150 of platform 102. The received light beam is reflected by both primary mirror 108 and fast steering mirror 118. The light beam 107 is then split by splitter 112 and output to light receiver 124.

As shown, the light beam is provided to tracking camera 120 via lenses 114 and mirror 116. In general, tracking camera 120 may provide a signal to control the angular tilt of fast steering mirror 118 and the focal point of lenses 114, in order to ensure proper transmission/reception of the light beam.

Figure 1C:
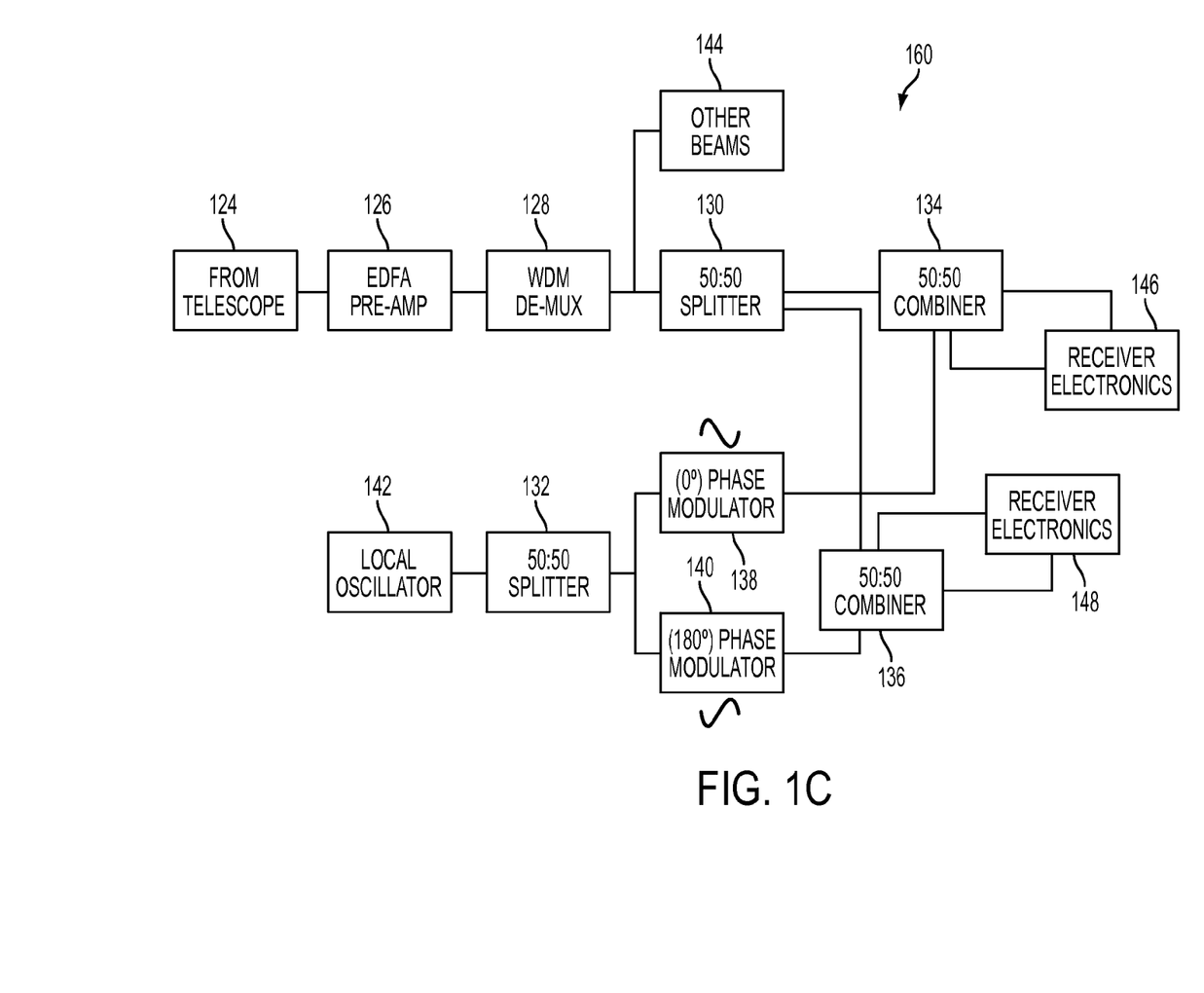
FIG. 1c is a block diagram of an interferometer on a communication platform, according to an embodiment of the present invention.

After light beam 106 is received by a platform, an interference pattern is produced by the present invention using an interferometer. As one example, FIG. 1c shows a block diagram of an in-phase interferometer, generally designated as 160, which may be included on platforms 102 and 104. Interferometer 160 includes light receiver 124, which is part of optical system 150 shown in FIG. 1b. The interferometer 160 includes amplifier 126, de-multiplexer 128 (which may be a wavelength division multiplexer), splitters 130 and 132, combiners 134 and 136, optional phase modulators 138 and 140, local oscillator 142 and receiver electronics 146 and 148. Additional receive beams may be provided, if required, by module 144.

In operation, light beam 106 is received by optical system 150 on platform 102 and output to light receiver 124. The light beam is then amplified by amplifier 126 and de-multiplexed by de-multiplexer 128. The other light beam generated by local oscillator 142 is split by splitter 132 and phase modulated by modulators 138 and 140, respectively. The two phase modulators are 180 degrees apart.

The received light beam output by splitter 130 and the phase modulated local oscillator light beam output by modulators 138 and 140 are then combined via combiners 134 and 136, respectively, generating optical fringes. Receiver electronics 146 and 148 process the optical fringes produced by combination of the light beams. Receiver electronics 146 and 148 of the present invention then compute various metrics, such as distance and velocity between platforms 102 and 104, as further explained below.

Figure 2A:
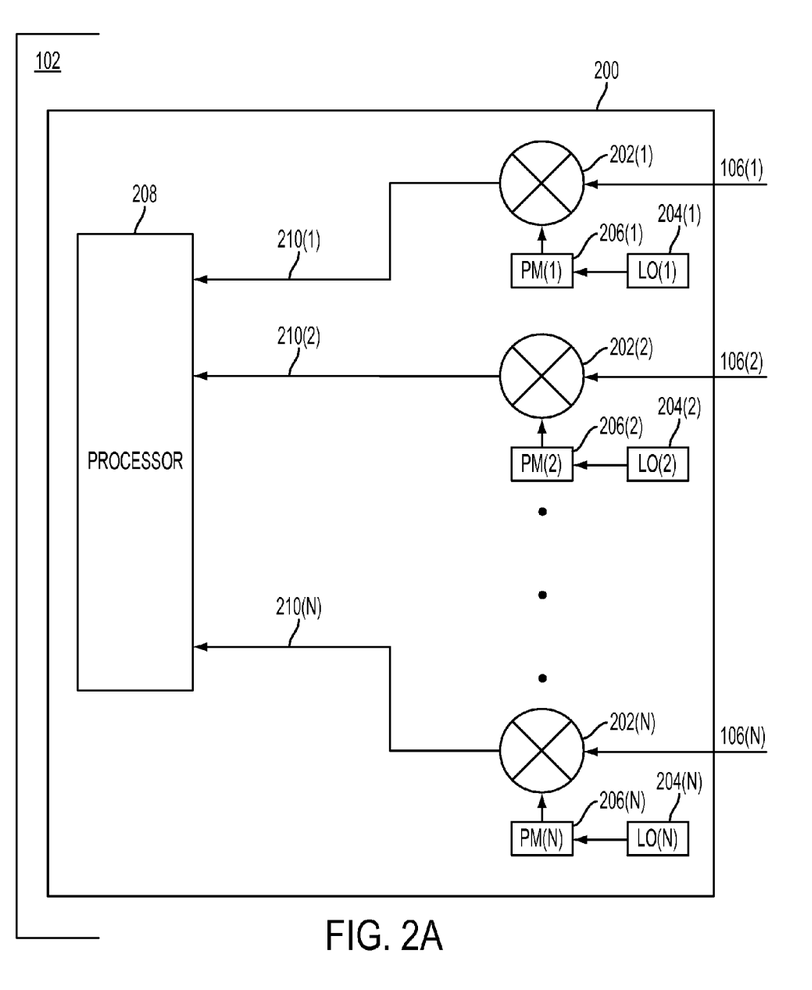
FIG. 2a is a velocity rate interferometer on a communication platform including a plurality of phase modulators modulating local oscillator signals, according to an embodiment of the present invention.

In one embodiment, as shown in FIG. 2a, velocity rate interferometer 200 computes the velocity between platforms 102 and 104. Velocity rate interferometer 200 includes mixers 202(1)-202(N), local oscillators (LOs) 204(1)-204(N), phase modulators (PMs) 206(1)-206(N) and processor 208. In operation, optical signal 105 is transmitted by platform 102 (for example) and reflected back (after possible amplification) from platform 104 as optical signal 106, where it is received by velocity rate interferometer 200 in platform 102. Multiple copies 106(1)-106(N) of reflected optical signal 106 are received, as shown, by velocity rate interferometer 200. Optical signals 106(1)-106(N) are inputted into mixers 202(1)-202(N), respectively.

Local oscillators (LOs) 204(1)-204(N) provide respective LO signals, which have wavelengths corresponding to respective received optical signals 106(1)-106(N), into PMs 206(1)-206(N). The LO signals are phase modulated by the set of PMs. Each PM in the set of PMs 206(1)-206(N) is initialized to a different phase angle with respect to the other PMs in the set, thereby uniquely phase modulating each LO. The resulting phase modulated signals are then, respectively, inputted into mixers 202(1)-202(N). The mixers multiply the resulting phase modulated signals with the multiple copies of the received optical signal, respectively, producing time varying fringe signals that are proportional to the velocity between platforms 102 and 104 convolved with the phase modulation of 206. These time varying fringe signals are designated as 210(1)-210(N).

Since the PMs are initialized to different phase angles with respect to each other, the starting frequency of each fringe signal is also different. As each fringe signal sweeps in time from a low frequency to a high frequency, the starting frequency of each sweep is different. These varying frequency sweeps of fringe signals 210(1)-210(N) from mixers 202(1)-202(N) are inputted to processor 208, where they are counted.

In general, the velocity between platforms 102 and 104 may be computed based on the number of fringes (of a certain wavelength) counted during a predetermined time interval. When the velocity between the platforms is high, however, the fringes may be too fast to be counted by processor 208. Since the present invention provides N time varying fringe signals (varying at N different phase angles), some of the fringe signals will have fringes moving sufficiently slow so that they may be counted. In general, processor 208 in FIG. 2a counts the fringes in each of the fringe signals, when the respective fringes are below a predetermined frequency threshold. The counting of the fringes is explained later with respect to FIG. 2c.

Figure 2B:
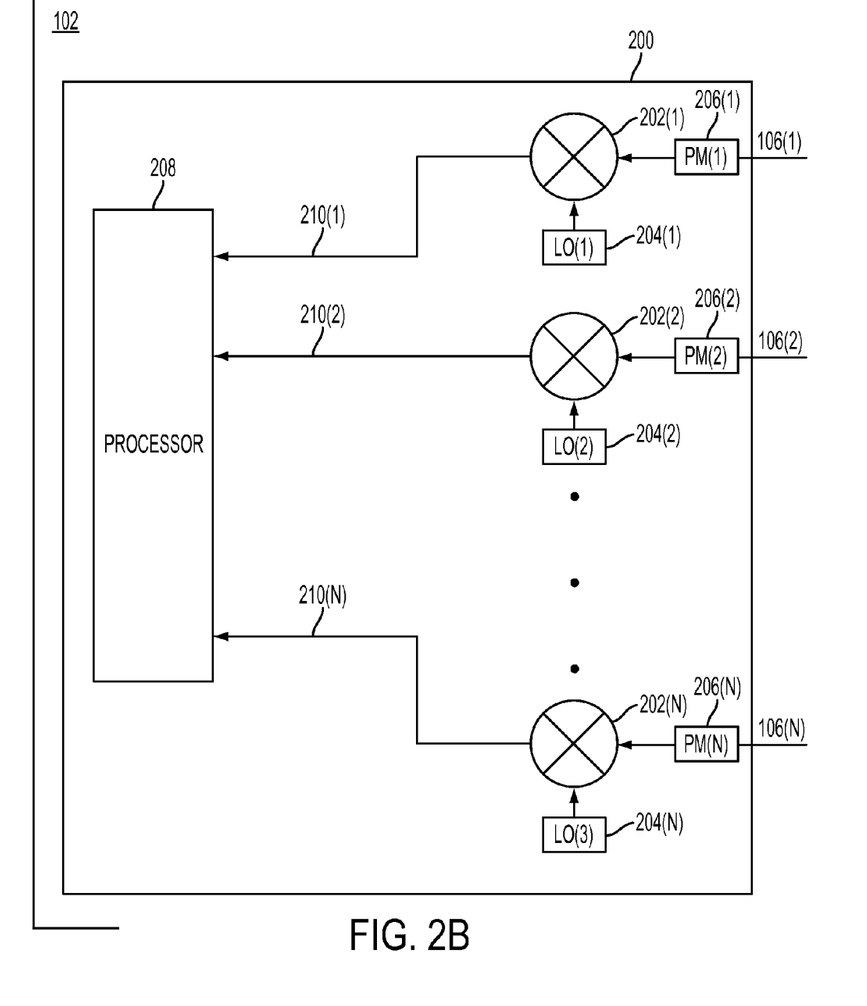
FIG. 2b is a velocity rate interferometer on a communication platform including a plurality of phase modulators modulating received signals, according to an embodiment of the present invention.

In another embodiment of the present invention, PMs 206(1)-206(N) may be configured, as shown in FIG. 2b, to phase modulate the received optical signals 106(1)-106(N), in lieu of modulating the LO signals from LO(1)-LO(N) of FIG. 1a. As shown, the received optical signals 106(1)-106(N) are directly inputted into PMs 206(1)-206(N), respectively, and then provided to mixers 202(1)-202(N). In contrast to FIG. 2a, the LO signals from LOs 204(1)-204(N) are directly inputted to mixers 202(1)-202(N). This embodiment, thus, also produces N time varying fringe signals (varying at N different phase angles), shown designated as 210(1)-210(N). These N time varying fringe signals may then be counted by processor 208.

Figure 2C:
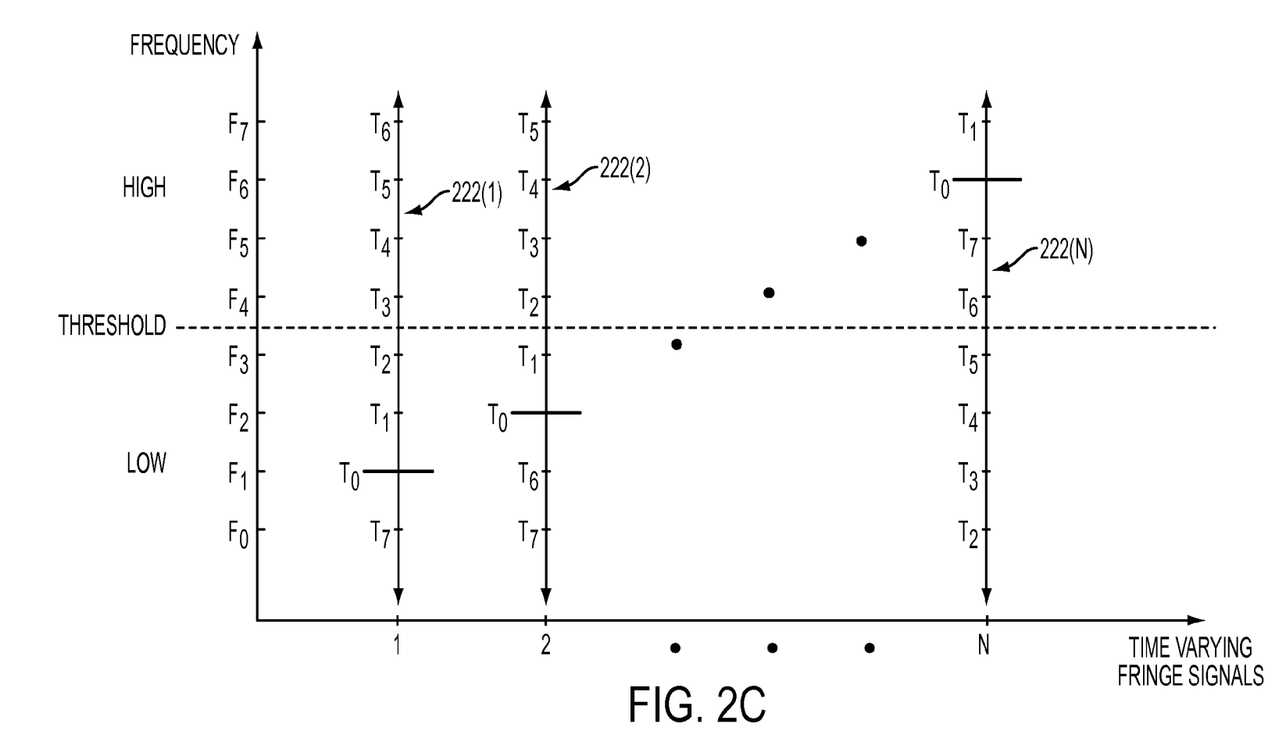
FIG. 2c is an example of frequency changes in the phase modulated time varying signals that are received by a processor shown in FIGS. 2a and 2b, according to an embodiment of the present invention.

Referring now to FIG. 2c, there is shown a plot of the frequency sweep for each of the N time varying fringe signals. In one example at time T0, the first fringe signal is at frequency F1, the second fringe signal is at frequency F2 and the Nth fringe signals is at frequency F6. As an example, each of the N fringe signals varies between frequencies F0-F7 at respective time points T0-T7. At times T0, T1, T2, T3 and T7 on line 222(1), the respective frequencies of the first fringe signal are at F1, F2, F3 and F0, respectively, which are below the predetermined frequency threshold. Similarly, at times T2-T5, the frequencies of the Nth fringe signal, represented by line 222(N), are at respective frequencies F0-F3, which are also below the frequency threshold.

Thus, at any given time, some of the fringe signals are below the frequency threshold and, therefore, may be counted by the processor. For example, at times T0-T1 and T7, processor 208 may count the fringes in the first fringe signal; at times T2-T5, processor 208 may count the fringes in the Nth fringe signal; and at time T6, processor 208 may count the fringes in the second fringe signal. Thus, processor 208 is able to count the fringes of any fringe signal that is below the frequency threshold and is able to maintain a cumulative count.

In general, velocity rate interferometer 200 may determine the magnitude of the velocity between the platforms. Determining the angular direction of the velocity may also be beneficial, in order to track the distance and geo-location between the platforms over time. To determine the direction of the velocity, the platforms that include velocity rate interferometer 200 (which may be considered an in-phase interferometer), may also include a duplicate velocity rate interferometer set in quadrature to the in-phase interferometer. This may be accomplished by setting the LOs (not shown) of the quadrature interferometer at a 90 degree phase shift relative to LOs 204(1)-204(N) of the in-phase interferometer. The output fringes of both the in-phase and quadrature interferometers may then be counted by a processor (not shown) to determine the magnitude and direction of the velocity between platforms 102 and 104.

In general, the in-phase/quadrature system described above is used to determine the sign of the velocity (a positive or negative sign indicates whether the platforms are moving toward or away from each other). In operation, the fringe pattern produced by the in-phase interferometer will lead or lag (in terms of phase) the fringe pattern produced by the quadrature interferometer. The inphase and quadrature system may be calibrated to associate leading in-phase fringes (for example) with a positive sign indicating platforms 102 and 104 are moving towards each other. The system would then associate lagging in-phase fringes with a negative sign indicating platforms 102 and 104 are moving away from each other.

Determining the direction of the velocity may also be accomplished by transmitting a second optical signal having a different wavelength (different color) than the first optical signal 105. Such an embodiment may include a first color interferometer and a second color interferometer that are similar to the interferometers shown in FIG. 2a or FIG. 2b. Each interferometer, however, is set to operate at a different wavelength. Thus, the LOs in the first color interferometer may be set to a first wavelength, and the LOs in the second color interferometer may be set to a second wavelength. The fringe outputs of the first and second color interferometers may then be counted by a processor (not shown) to determine both magnitude and direction of the velocity between platforms 102 and 104. By transmitting more than one color (e.g. colors A and B), the leading and lagging fringe patterns of each color oscillate (due to their time varying nature) between signs indicating whether the platforms are moving toward or away from each other. For example, if platforms 102 and 104 are flying parallel towards each other, the relative distance between the platforms is decreasing. However, the fringe pattern over time oscillates between A and B in terms of which one is leading or lagging. Thus, past fringe patterns are monitored to account for whether the platforms are moving toward or away from each other. While the distance is decreasing, color A may have leading fringes while color B may have lagging fringes. At a later time, the opposite may be the case (A is lagging and B is leading) even though the vehicles are still moving toward each other. When the platforms pass each other in space, the relative distance between the platforms begins to increase. At the time when the platforms pass each other, the previously leading fringes of color A change to lagging fringes while the previously lagging fringes of color B change to leading fringes. The leading/lagging change between the colors indicates that the platforms are moving away from each other. Since this method involves fringe patterns that oscillate with time, there is a possibility that the change in the fringe pattern due to the change in direction will coincide with the change in fringe pattern due to color pattern oscillation. This possibility may be a consideration for some applications, especially those involving nodes that frequently change velocity directions.

Described above is a two color embodiment for determining the direction of velocity between the platforms. In other embodiments, however, more than two colors may be utilized to reduce the likelihood of fringe matching ambiguity thereby ensuring that the change in direction is detectable by the processor.

In either of the embodiments described above, the velocity between the platforms may be used to track the distance between the platforms over time. By computing the magnitude and direction of the velocity between the platforms, and the initial distance between the platforms (as described below), the platforms may be spatially coordinated over time.

Figure 3A:
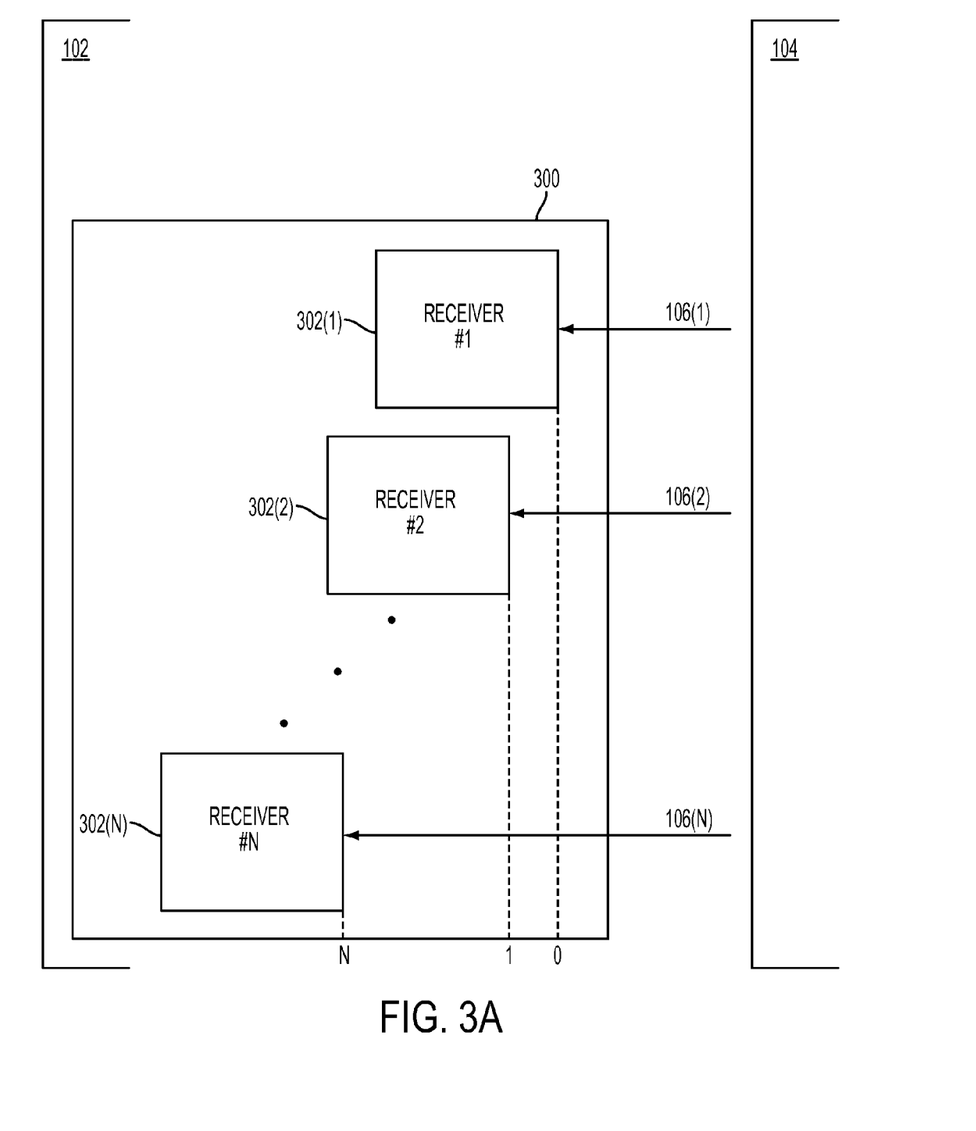
FIG. 3a is an example of a communication platform having multiple Vernier-scale style interferometer receivers which are spatially offset from each other, according to an embodiment of the present invention.

Referring next to FIG. 3a, there is shown receiver system 300 on platform 102 (for example) having multiple Vernier-scale style receivers (or spatially staggered receivers). By spatially staggering receivers 302(1)-302(N) with respect to platform 104, multiple signals 106(1)-106(N), which are copies of optical signal 106 are received at slight temporal offsets with respect to one another (e.g. receiver 302(2) receives signal 106(2) after receiver 302(1) receives optical signal 106(1)).

In general, optical signals are received in time slot sequences of each of the N receivers on platform 102. By spatially staggering the receivers in platform 102 with respect to platform 104 (e.g. receiver 302(N) is physically farther away from platform 104 than receiver 302(N−1)), the time slot sequences of each receiver is also temporally offset from other time slot sequences of each other receiver.

Figure 3B:
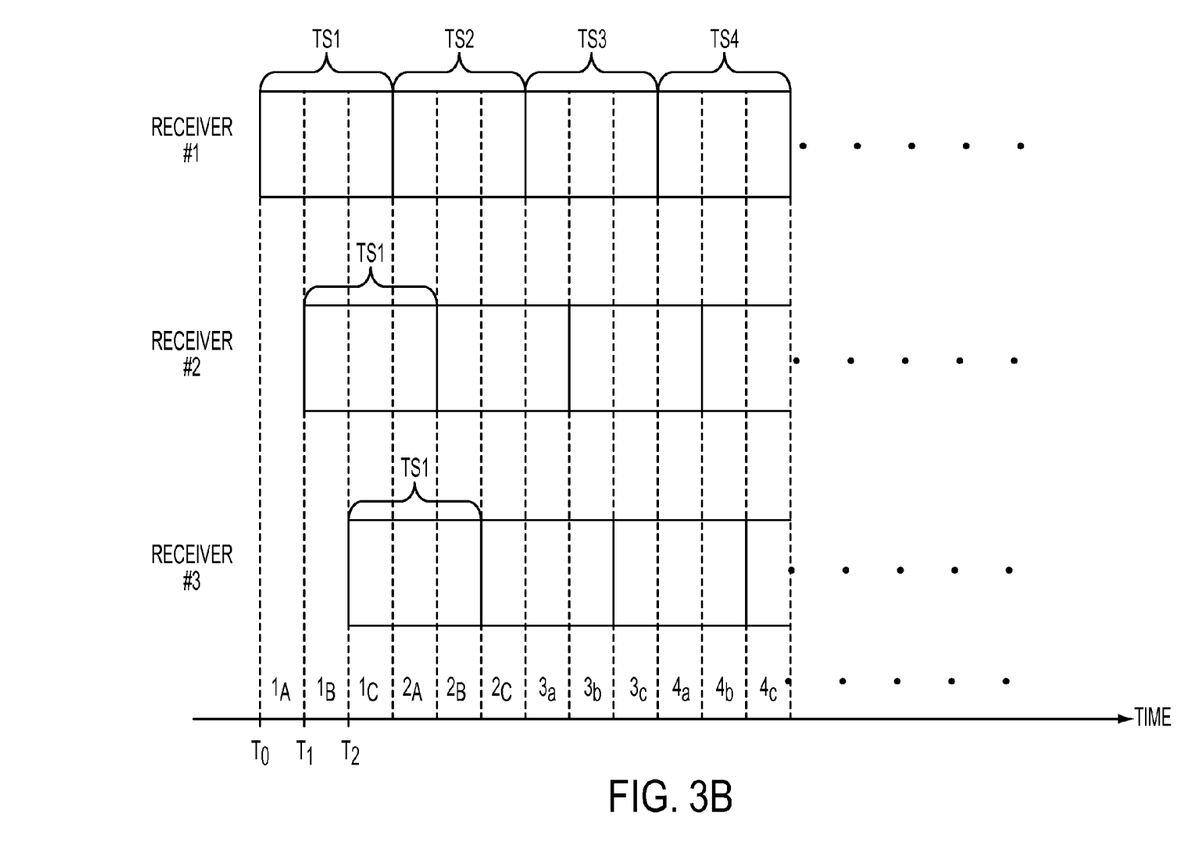
FIG. 3b is an example of three temporally offset time slot sequences for each of the three receivers shown in FIG. 3a, according to an embodiment of the present invention.

An example of temporally offset time slot sequences of a platform having three Vernier-scale style receivers is shown in FIG. 3b. Because receiver 302(1) of FIG. 3a is positioned closest to platform 104, time slot TS1 for receiver #1 in FIG. 3b starts at time T0. Since receivers 302(2) and 302(3) are spatially staggered further away from platform 104 with respect to receiver 302(1), however, their respective time slots sequences are temporally offset to start at delayed times (receiver #2 time slot TS1 starts at T1 and receiver #3 time slot TS1 starts at T2 respectively).

By overlapping the staggered time slot sequences of receivers 1, 2 and 3, smaller time slots are realized by the present invention (large time slot TS1 may be divided into smaller time slots 1A, 1B and 1C, as shown in FIG. 3b). In general, a receiver system having N receivers, may divide each time slot into N smaller time slots, because each receiver is spatially offset from its adjacent receiver by 1/N time units. The present invention, thus, increases the precision of spatial position detection by a factor of N.

In operation, when an optical pulse 105 is transmitted by platform 102, reflected from platform 104 and received by platform 102 as optical pulse 106, the received time interval is further divided by a factor of N when using N receivers. For example, if the three receivers shown in FIG. 3a receive the same round trip signal 106 (for example a pulsed signal) in each respective first time slot TS1, the present invention may confidently determine that the round trip pulse is located in sub-time slot 1c (sub-time slot 1c is common to the first time slot TS1 in all three receivers). If, however, the pulsed signal is only found in the second time slot TS2 of receiver 1 and found in the first time slots TS1 of receivers 2 and 3, then the present invention may confidently determine that the round trip pulse is located in sub-time slot 1c. Thus, the present invention achieves an improved distance measurement between two platforms by an accuracy factor of three, when using three spatially staggered receivers. An improved distance measurement between two platforms by an accuracy factor of N may be achieved, by using N spatially staggered receivers.

Figure 3C:
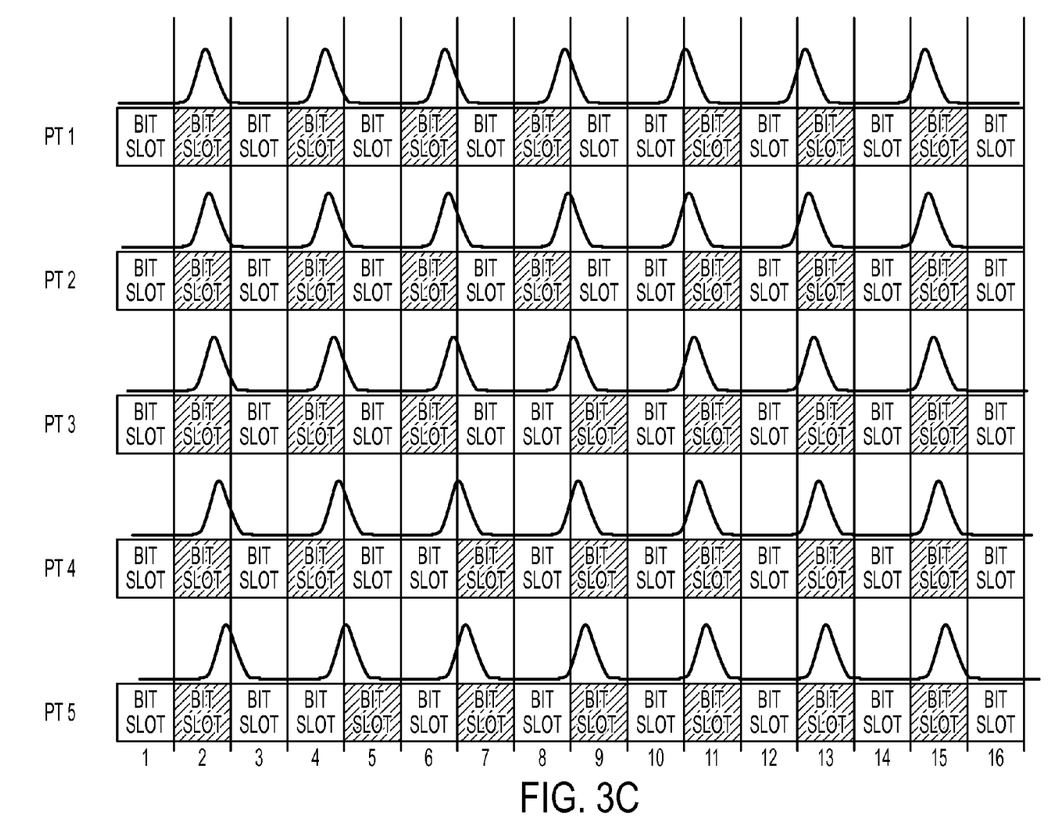
FIG. 3c is an example of five temporally offset Vernier-scale style pulse trains received by a communication platform, according to an embodiment of the present invention.

In another embodiment, distance between platforms may be measured with a Vernier-scale style pulse train (PT) having a period greater than the width of a time slot (shown as a bit slot in FIG. 3c). When the period of the PT is greater than the width of a bit slot, a bit slot is eventually skipped (note that PT1 skips bit slot 10). Referring to FIG. 3c, there is shown five examples of Vernier-scale style PTs, namely PT1-PT5, where each PT has a period greater than two bit slots and each PT has a different temporal offset (note that the first pulse of each PT is located in a different position within bit slot 2; similarly, the second pulse of each PT is located in a different position within bit slot 4; and so on.). Moreover, the bit slots receiving PT1-PT5 are shown shaded to indicate detection of a pulse (logic 1) and not shaded to indicate lack of a pulse (logic 0).

Accordingly, the first pulse of PT1 is transmitted as signal 105 from platform 102 and received as reflected signal 106. In this example, PT1 may be detected in the center of bit slot 2. Thus, PT1 produces a double zero bit pattern (two logic 0s in a row) in bit slots 9 and 10, respectively. With respect to PT2, which is only slightly offset from PT1, one observes that PT2 produces the same double zero bit pattern in bit slots 9 and 10, similar to PT1. However, examining PT4, which is further offset from PT1, one observes that PT4 produces a double zero bit pattern in bit slots 5 and 6, respectively. Finally, with respect to PT5, which is even further offset from PT1, one observes that PT5 produces a double zero in bit slots 3 and 4, respectively.

In general, the location of the bit slots in which a double zero bit pattern occurs (two logic 0s in a row) may be used to provide a more precise location within a bit slot (i.e. a sub-bit slot). For example, since the double zero bit pattern in PT1 occurs in slots 9 and 10, the receiver of platform 102 may determine that the first pulse of PT1 was received in the middle of bit slot 2. Since the double zero bit slot in PT5 occurs in slots 3 and 4, the receiver of platform 102 may determine that the first pulse of PT5 was received towards the end of bit slot 2. Thus, the bit slots of the receiver may be further divided into smaller sub-bit slots for more accurately determining the received time of a pulse. In the example of FIG. 3c, five PTs are shown, where each PT is similar to the other PTs, except that each PT is shifted slightly from the other PT.

When implementing the pulse train (PT) described above, only one receiver is required to be disposed in platform 102 (for example). When pulse train 106 arrives after being reflected from platform 104, as shown in FIG. 3a, the present invention may determine the position of the pulses to an accuracy of sub-bit slots, by examining where the double zero bit pattern occurs.

Although the Vernier-scale style receivers increase the precision of the distance measurement by allowing the time slots to be divided into multiple sub-time slots, further precision may be desirable. In order to obtain even further precision (e.g. micron precision), a multi-color technique is used by the present invention to supplement the Vernier techniques described above.

Figure 4A:
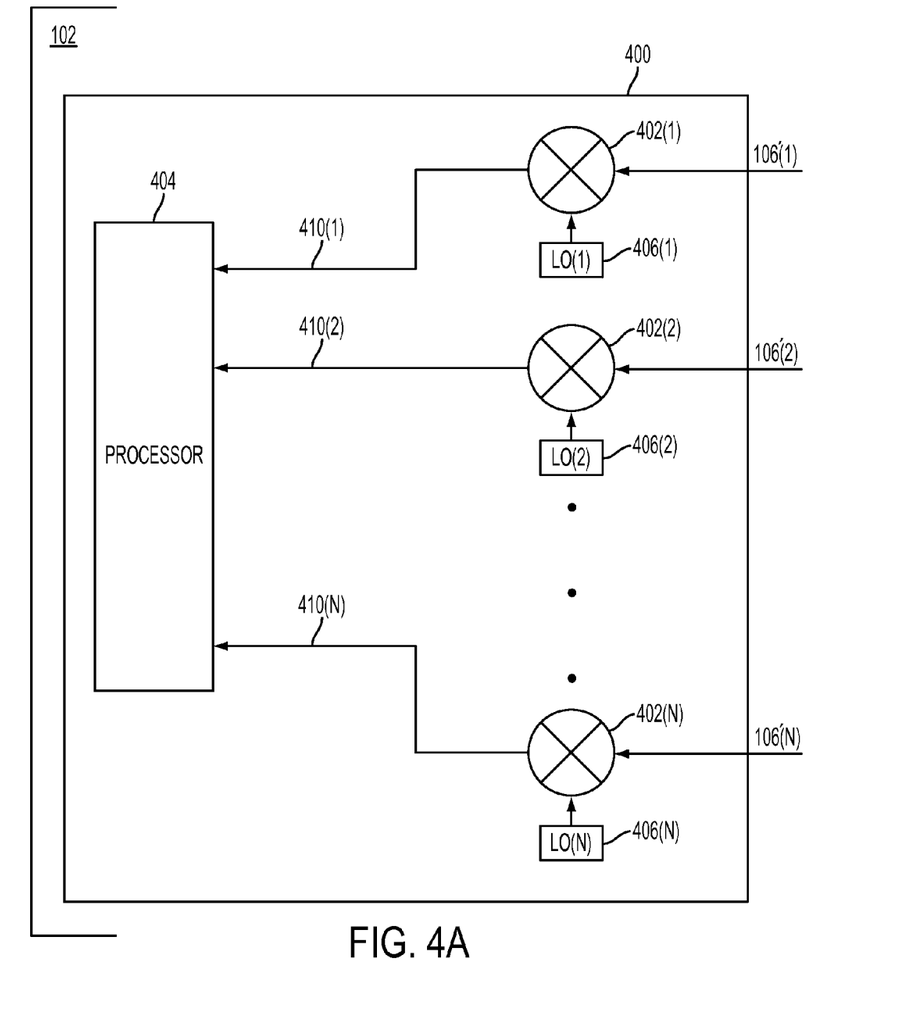
FIG. 4a is a multi-color interferometer system on a communication platform, according to an embodiment of the present invention.

Referring now to FIG. 4a, interferometer 400 of platform 102 (for example) may include LOs 406(1)-406(N) and processor 404. Specifically, N optical signals 105(1)-105(N) each set to a different color (or wavelength), may be transmitted towards platform 104 and then received by platform 102 as reflected signals 106'(1)-106'(N) respectively. The received colors may be mixed with unique LOs, each LO having a wavelength set to a color corresponding to one of the N transmitted/received colors.

The fringe signals produced by mixers 402(1)-402(N), in which each has a unique frequency, may be compared to one another, by processor 404, to determine when they match (light fringes of one signal line up with light fringes of another signal) or mismatch (light fringes of one signal line up with dark fringes of another signal). Each fringe signal matches and mismatches another fringe signal at a time interval based on the wavelengths of the signals. The interval at which the signals match is correlated to a distance that the beam of light has traveled. Therefore, based upon the percentage of match/mismatch over a period of time (e.g. 0% is a mismatch, 1%-99% is a partial match, 100% is a match) between the N signals (or channels), processor 404 is able to further refine the distance measurement produced by the Vernier-scale style receivers.

Figure 4B:
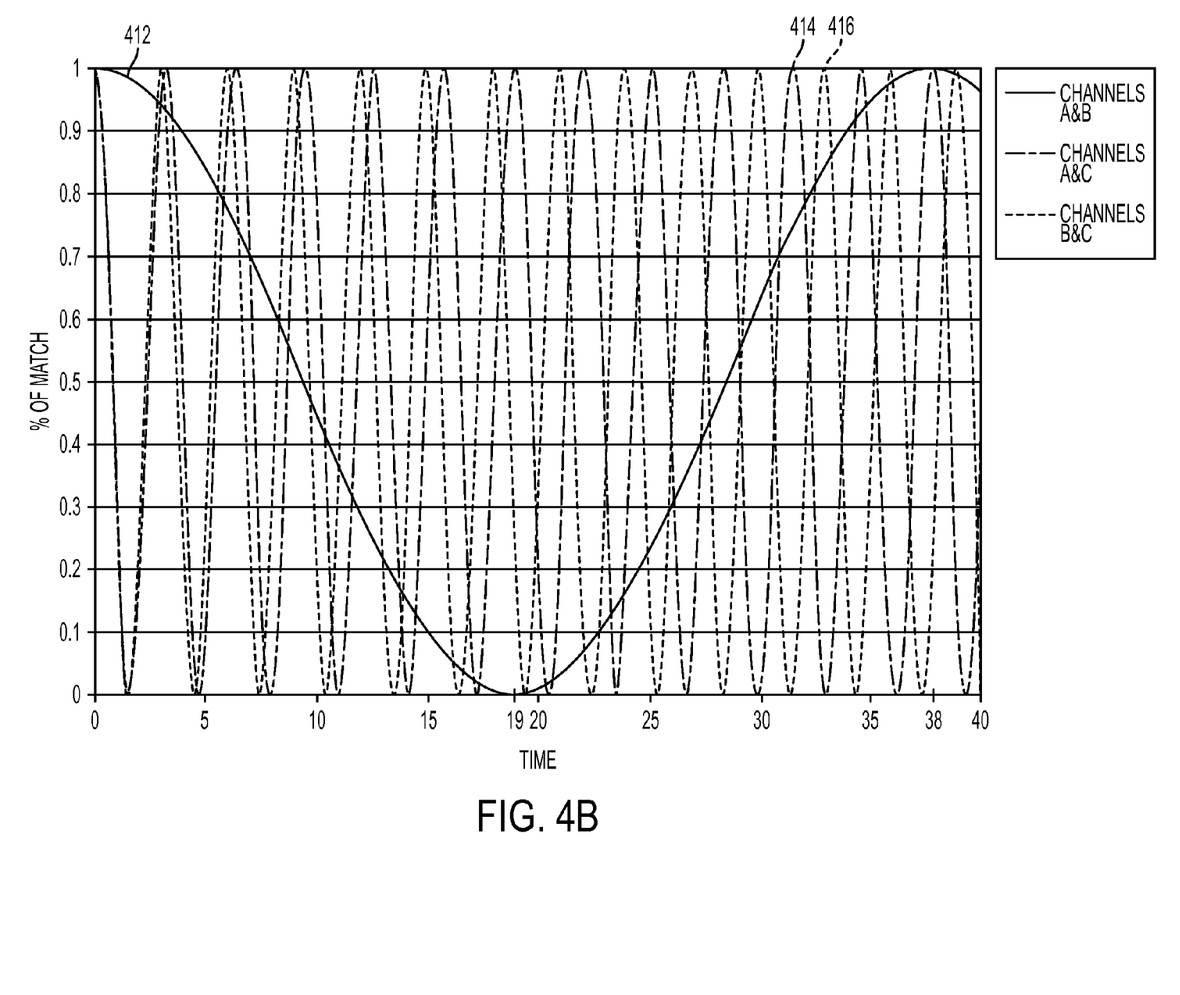
FIG. 4b is a plot showing the percentage of fringe matches between channels (A and B), (A and C), and (B and C), according to an embodiment of the present invention.

An example of the result from a three channel (A, B and C) multi-color interferometer system is plotted in FIG. 4b. The plot shows three signals 412, 414 and 416. Signal 412 indicates the percentage of match between the fringes of channels A and B. Signal 414 indicates the percentage of match between the fringes of channels A and C. Signal 416 indicates the percentage of match between the fringes of channels B and C. In one example, channels A, B and C correspond to fringe signals 410(1), 410(2) and 410(3) compared by processor 404 in FIG. 4a.

The ordinate axis in FIG. 4b shows the percentage of fringe match as it varies from 0 to 1, corresponding to a range of 0 to 100 percent of fringe match. The abscissa axis represents time. The fringes in channels A and B, as indicated by curve 412, match each other at time 0 and are mismatched at approximately unit time 19. Channels A and B then match each other again at approximately unit time 38. The other curves, namely curves 414 and 416, produce matches and mismatches that are more rapidly changing in time than curve 412.

Thus, the fringe matches between channels A and B, A and C, and B and C vary with time at different rates depending on the wavelengths of the colors. For example, channels A and B match and mismatch each other at a slower rate than does channels A and C or channels B and C.

The fringe patterns in the multi-color system match/mismatch each other at set time intervals; these set time intervals correspond to set distances. For example, in FIG. 4b, channels (A, B), (A, C) and (B, C) all match each other at time 0 and then all match each other again at predetermined intervals designated as time T, 2T, 3T, etc (not shown). In one example, a lapse of time T may correspond to 1 mm of range separation between platforms 102 and 104 (channels (A, B), (A, C) and (B, C) all match each other every 1 mm, 2 mm, 3 mm, etc.). Therefore, comparing the channel matching percentage at an instance of time provides the precise distance that the signals have traveled.

For example, if a round trip Vernier-scale style pulse train having a resolution of 1 mm is transmitted from platform 102 to 104, an absolute distance measurement between the platforms may be determined as being in the range of 15,101 mm-15,102 mm.

To further refine the distance between the platforms (sub-millimeter precision), three colors A, B and C are also transmitted between platforms. In one example, if the percentage of fringe matching between received signals (A, B), (A, C) and (B, C) are 0%, 90% and 40% respectively (see time 19 in FIG. 4b), it may be determined that the signals have traveled 0.257 mm. Thus, the range separation between the platforms would be determined as 15,101.257 mm. In general, supplementing the Vernier-scale style pulse train or receivers with the multi-color technique, may further refine the distance resolution to within micron resolution (e.g. discrete time points along FIG. 4b correspond to 0.001 mm steps).

Accurately determining the distance and velocity between platforms allows accurate synchronization between clocks in each platform. Once spatial coordination is performed, clock synchronization may also be accomplished through any of a variety of methods. In general, one platform may have a precise master clock to which all other platforms (having less accurate slave clocks) are synchronized. Since the distance between platforms is known to within microns of accuracy at any given time, the clocks may be corrected to a sub-nanosecond, or even to a more precise level.

Clock synchronization may be beneficial in a number of applications. In digital communication applications, such as pulse position modulation (PPM), for example, accurate clock synchronization is desirable. In conventional PPM systems, the clock is usually extracted from the data signal itself. In order to extract the clock, the time between adjacent pulses in a PPM system should not exceed a certain period. A small period between adjacent pulses ensures that the clock may be recovered. This small period, however, restricts each pulse to a small number of time slots. By decreasing the number of time slots, each pulse represents a smaller number of bits, thereby decreasing throughput.

In a system using the present invention, the clocks between platforms are accurately synchronized due to the MFO link and a clock does not need to be extracted from the PPM data signal. The present invention thus allows the pulse window (time between adjacent pulses/number of time slots) to be increased and, consequently, throughput to also be increased.

Figure 5:
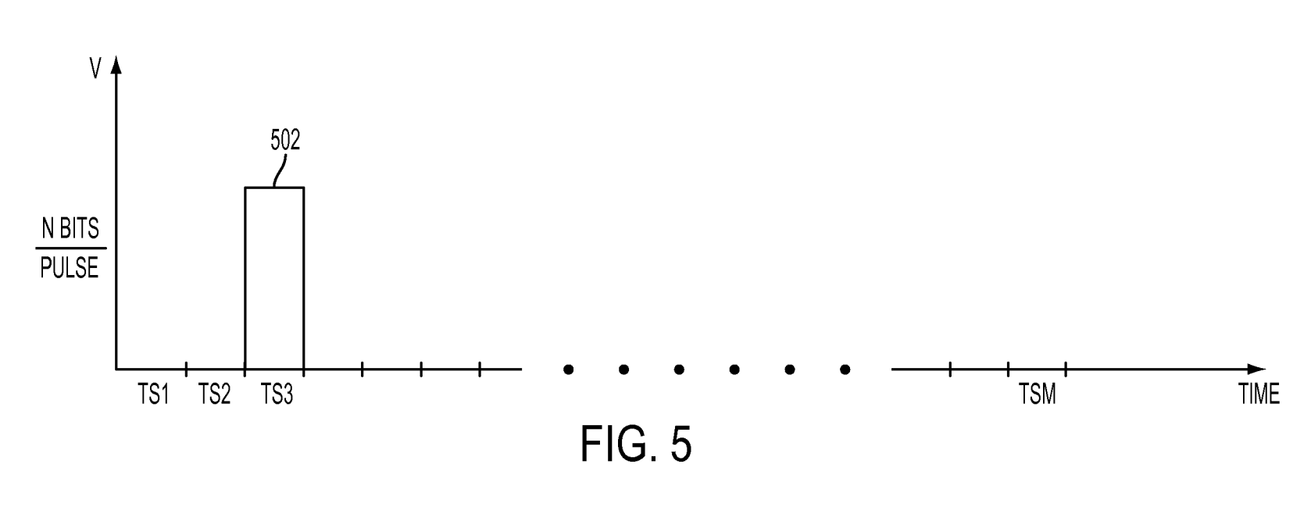
FIG. 5 is a plot of a pulse position modulation (PPM) waveform including M time slots, in which each pulse represents N bits, according to an embodiment of the present invention.

As shown in FIG. 5, pulse 502 may be positioned in any one of M time slots (TS1-TSM). By having M time slots, each pulse represents N bits where $M=2^N$. By increasing the number of time slots in the pulse window (M is made large), each pulse may then represent more bits. For example, if there are 64 time slots within the pulse window, each pulse may represent up to 6 bits of data. If the pulse window is increased to include 1,048,576 time slots, then each pulse may represent up to 20 bits of data. In general, more time slots are made possible in a pulse window, due to accurate clock synchronization between the platforms.

In an MFO system of the present invention, individual pulses in a PPM system may represent upwards of 20 bits or more. By adding parallel channels of PPM, however, it is possible that data rates in excess of 50 gigabytes per second may be realized.

As described, the present invention improves the performance of applications that rely on time and space coordination. One application includes multistatic interferometric synthetic aperture radar (MISAR). By linking multiple SAR platforms together using MFO links of the present invention, closure of a real-time baseline between sensors is possible, thereby enabling interferometric processing of disparately collected synoptic synchronized data sets. Through the use of multiple platforms, this baseline closure leads to the ability to generate 3-dimensional imagery in near-real-time with an added capability of tracking moving objects.

Using multiple optical links allows multiple functions to be performed: (1) They allow accurate baseline separation determination (with accuracy better than 2 cm, less than one wave at X-band). (2) They allow time synchronization across all platforms to within sub-nanosecond precision (thereby, reducing the need for a high-precision time instrument on some of the platforms, leading to lighter sensors). (3) They allow data to be offloaded from the platforms in real time at multi-gigabit rates, thereby, reducing onboard storage and processing; this also leads to lighter sensor payloads because sensor data is piped to one location and processed at the same location, as opposed to being stored or processed on each platform.

Another application that may benefit from the present invention is global positioning satellites (GPS). Having precise knowledge of time and geo-location across a constellation of satellites may simplify the electronics and software needed in a handset on the ground. These satellite cross-links may provide information on each satellite that enables more rapid position convergence, with position location to within inches in a time frame of seconds, rather than minutes.

Another application that may benefit from the present invention is data security. Data downlinks to the ground may include encryption methods that are time-based. With a-priori knowledge of a time-based encryption (e.g. data is encrypted based on the time that a bit arrives), low overhead encryption is possible with security and minimal latency.

Yet another application that may benefit from the present invention is next generation clocks. Researchers are continuously working on making clocks that are smaller and more accurate. However, as clocks become more accurate, the relationship between time and space becomes more important. Having multiple platforms time-synchronized to picosecond accuracy may be more beneficial if the distance between platforms is also known. This is especially important with vehicles that must cooperate with each other using a time standard. Signals propagating between platforms that are time-coordinated may also be spatially coordinated to increase their utility.

In general the present invention provides the ability to determine range to within micron precision which suggests the ability to synchronize time to tens of femto-seconds. Such accuracy may provide methods for better understanding gravity and velocity adjustments to the time/space continuum, as well as better understanding of the behavior of light in a vacuum and on moving vehicles near a large gravitational object. Time discrepancies in certain experiments may also be better identified as being a product of clock physics, the speed of the vehicles or gravitational fluctuations in our solar system.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for determining velocity between first and second platforms, the first platform comprising:
   a receiver for receiving a signal from the second platform, the receiver including:
      multiple phase modulators (PMs), in which the PMs have phase angles different from each other, and each PM forms a signal having a time varying frequency,
      multiple mixers producing multiple fringe signals based on the time varying signals of the PMs and the received signal from the second platform, and
      a processor for counting the fringes in at least one of the fringe signals,
      wherein the fringes of the at least one fringe signal are counted when the frequency of the at least one fringe signal is below a predetermined frequency threshold; and
      the processor determines the velocity between the first and second platform based on a number of fringes counted in a time period;
   further comprising
   local oscillators input to the mixers,
   wherein the PMs modulate the local oscillators producing the time varying signals, and the time varying signals are mixed with the signal received from the second platform producing the fringe signals.

2. The system of claim 1, further including quadrature local oscillators input to the mixers,
   wherein the local oscillators are 90 degrees out of phase with the quadrature local oscillators, the mixers producing inphase time varying fringe signals and the quadrature mixers producing quadrature time varying fringe signals, and
   wherein the processor determines a direction of the velocity based on the inphase and quadrature fringe signals.

3. The system of claim 2, wherein
   the processor determines an initial distance between the first and second platforms, and tracks the distance over a time period based on the initial distance, determined velocity and direction of the velocity.

4. The system of claim 1, wherein
   the receiver receives a plurality of signals having different wavelengths;
   the mixers produce a plurality of fringe signals for each of the different wavelength signals;
   the processor refines the velocity between the first and second platforms by determining a time when the fringe signals match.

5. The system of claim 4, wherein
   the receiver receives at least three signals having different respective wavelengths, and the mixers produce three fringe signals.

6. The system of claim 5, wherein
   the processor determines, in a time period, a percentage of fringe match between:
   a) a first fringe signal and a second fringe signal,
   b) the first fringe signal and a third fringe signal, and
   c) the second fringe signal and the third fringe signal.

7. The system of claim 6, wherein
   the processor compares the percentage of fringe match of a-c at a time to refine the velocity between the first and second platforms.

8. A system for determining velocity between first and second platforms, the first platform comprising:
   a receiver for receiving a signal from the second platform, the receiver including:
      multiple phase modulators (PMs), in which the PMs have phase angles different from each other, and each PM forms a signal having a time varying frequency,
      multiple mixers producing multiple fringe signals based on the time varying signals of the PMs and the received signal from the second platform, and
      a processor for counting the fringes in at least one of the fringe signals,
      wherein the fringes of the at least one fringe signal are counted when the frequency of the at least one fringe signal is below a predetermined frequency threshold; and
      the processor determines the velocity between the first and second platform based on a number of fringes counted in a time period; and
   further comprising
   local oscillators input to the mixers, wherein the PMs modulate the signal received from the second platform producing the time varying signals, and the time varying signals are mixed with the local oscillators producing the fringe signals.

9. The system of claim 8, further including
quadrature local oscillators input to the mixers,
wherein the local oscillators are 90 degrees out of phase with the quadrature local oscillators, the mixers producing inphase time varying fringe signals and the quadrature mixers producing quadrature time varying fringe signals, and
wherein the processor determines a direction of the velocity based on the inphase and quadrature fringe signals.

10. The system of claim 9, wherein
the processor determines an initial distance between the first and second platforms, and tracks the distance over a time period based on the initial distance, determined velocity and direction of the velocity.

11. The system of claim 8, wherein
the receiver receives a plurality of signals having different wavelengths;
the mixers produce a plurality of fringe signals for each of the different wavelength signals;
the processor refines the velocity between the first and second platforms by determining a time when the fringe signals match.

12. The system of claim 11, wherein
the receiver receives at least three signals having different respective wavelengths, and the mixers produce three fringe signals.

13. The system of claim 12, wherein
the processor determines, in a time period, a percentage of fringe match between:
a) a first fringe signal and a second fringe signal,
b) the first fringe signal and a third fringe signal, and
c) the second fringe signal and the third fringe signal.

14. A system for determining velocity between first and second platforms, the first platform comprising:
a receiver for receiving a signal from the second platform, the receiver including:
multiple phase modulators (PMs), in which the PMs have phase angles different from each other, and each PM forms a signal having a time varying frequency,
multiple mixers producing multiple fringe signals based on the time varying signals of the PMs and the received signals from the second platform, and
a processor for counting the fringes in at least two of the fringe signals,
wherein the fringes of the two fringe signals are counted when the frequencies of the two fringe signals are below a predetermined frequency threshold; and
the processor determines the velocity between the first and second platform based on a number of fringes counted in a time period for each of the two fringe signals.

15. The system of claim 14, further comprising
local oscillators input to the mixers,
wherein the PMs modulate the signal received from the second platform producing the time varying signals, and the time varying signals are mixed with the local oscillators producing the fringe signals.

16. The system of claim 14, further comprising
local oscillators input to the mixers,
wherein the PMs modulate the local oscillators producing the time varying signals, and the time varying signals are mixed with the signal received from the second platform producing the fringe signals.

17. The system of claim 14, wherein
the receiver receives a plurality of signals having different wavelengths;
the mixers produce a plurality of fringe signals for each of the different wavelength signals; and
the processor refines the velocity between the first and second platforms by determining a time when the fringe signals match.

\* \* \* \* \*